US005307918A

United States Patent [19]

Rivera et al.

[11] Patent Number: 5,307,918

[45] Date of Patent: May 3, 1994

[54] ESCALATOR COMBPLATE STOP SWITCH ASSEMBLY

[75] Inventors: James A. Rivera, Bristol; Dat Nguyen, New Britain, both of Conn.

[73] Assignee: Otis Elevator Company, Farmington, Conn.

[21] Appl. No.: 914,823

[22] Filed: Sep. 15, 1992

[51] Int. Cl.$^5$ .............................................. B65G 25/00

[52] U.S. Cl. .................................................... 198/323

[58] Field of Search ......................................... 198/323

[56] References Cited

U.S. PATENT DOCUMENTS 3,132,733 5/1964 Boman et al. ........................ 198/323
3,233,717 2/1966 Minejiro Jin et al. .............. 198/323
3,913,723 10/1975 Johnson .............................. 198/323
3,934,699 1/1976 Saito et al. .......................... 198/323
4,088,219 5/1978 Binns ................................... 198/323
4,476,971 10/1984 Schöneweiss ....................... 198/323
4,629,052 12/1986 Kitamura ............................ 198/323

FOREIGN PATENT DOCUMENTS 1373665 2/1988 U.S.S.R. .............................. 198/323

*Primary Examiner*—Cheryl L. Gastineau

[57] ABSTRACT

A power switch assembly is operably connected to the combplate of an escalator for selectively shutting off the escalator in the event of entrapment of some object between the steps and combplate. When an object becomes wedged between the steps and combplate, the latter will be lifted or pushed upwardly away from the steps. The upward movement of the combplate operates a power interruption switch to stop further movement of the steps and handrail. The combplate is supported on the truss by spring assemblies which serve to effectively lower the weight of the combplate so that upward movement of the latter is more readily accomplished. The assembly can be retrofitted onto older existing escalators with heavier combplates than are found in newer equipment.

18 Claims, 4 Drawing Sheets

FIG-1
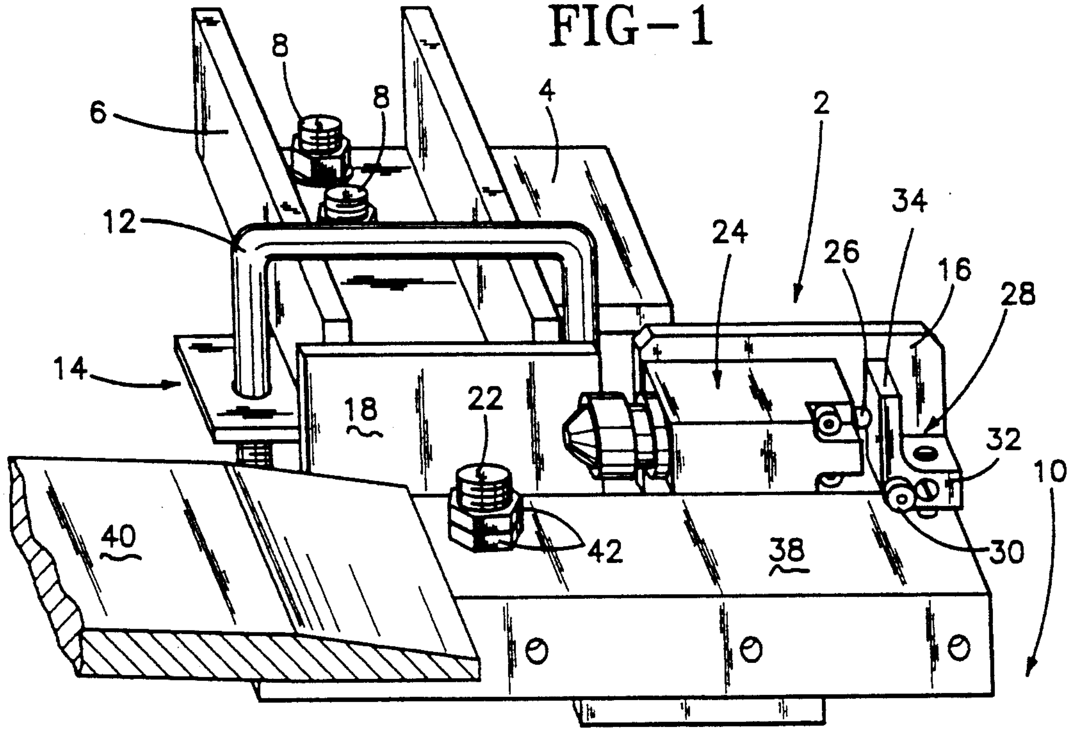
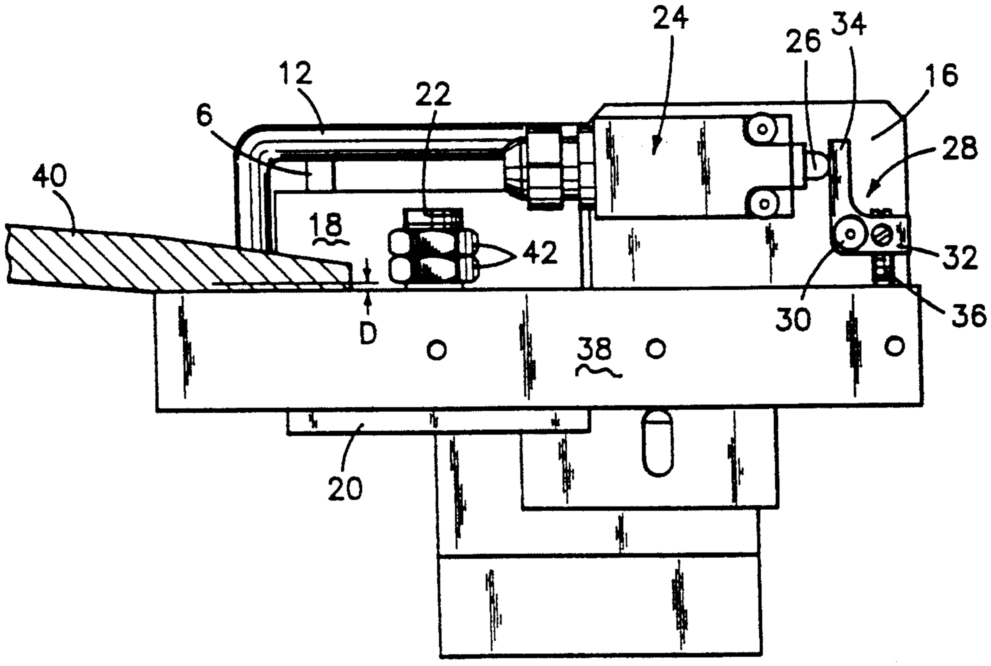
FIG-2

FIG-4
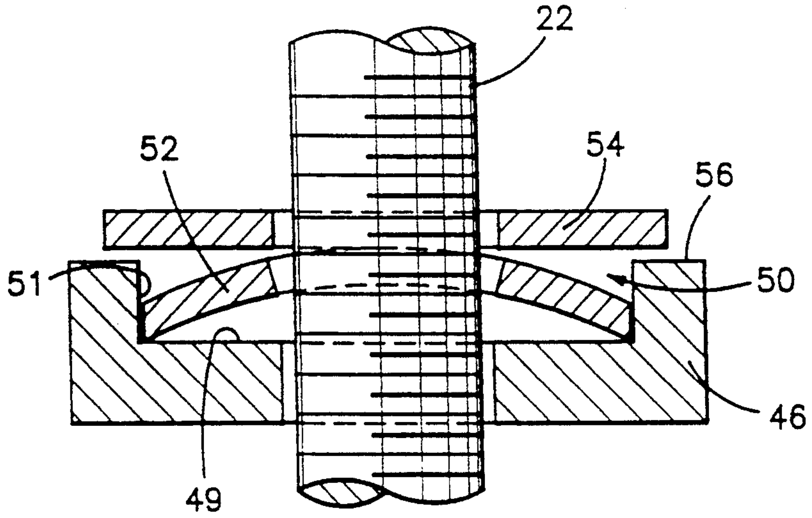
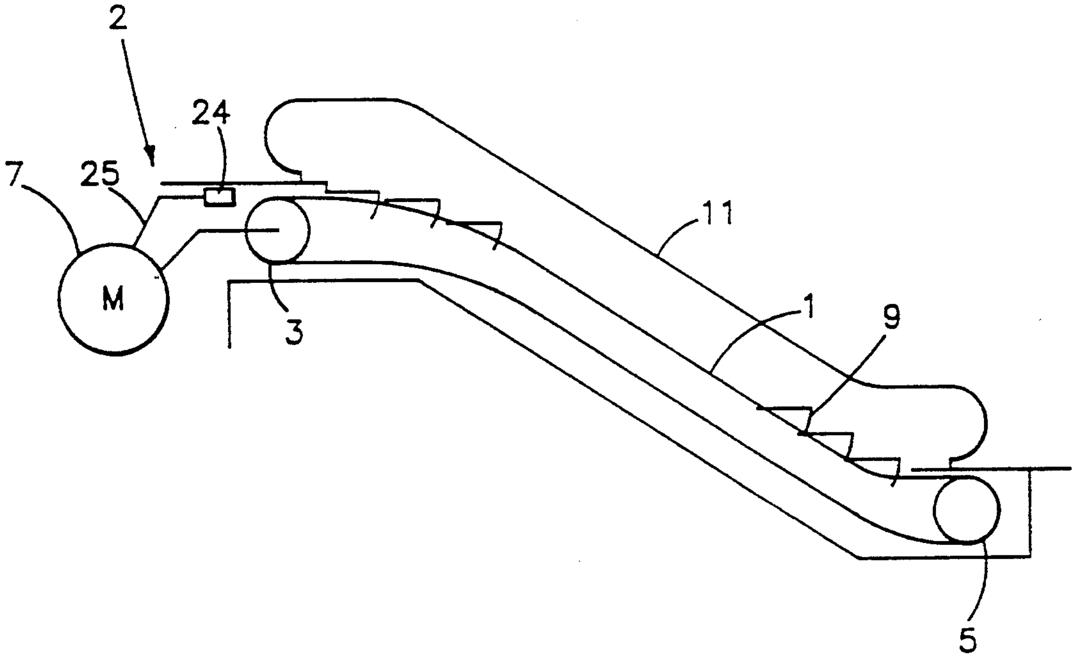
FIG-6

ESCALATOR COMBPLATE STOP SWITCH ASSEMBLY

DESCRIPTION

1. Technical Field

This invention relates to a safety assembly for an escalator which serves to shut the escalator off in the event that an object becomes wedged between the escalator step treads and the exit landing combplate. More particularly, this invention relates to such an assembly which is activated by upward movement of the combplate relative to the steps.

2. Background Art

Escalators and moving walkways are commonly provided with passenger supporting steps or pallets that have cleated treads. At the exit landing, the treads pass beneath a landing plate that is provided with combteeth which pass through the gaps between the tread cleats. The possibility exists that an object can be carried with the treads beneath the combplate and be trapped or wedged between the tread and the combplate. The prior art has recognized this problem and has devised a number of systems which can detect the presence of an object between the tread and combplate, and can sound an alarm and/or shut the escalator or walkway off in certain cases. U.S. Pat. Nos. 3,233,717 to Jin et al; 3,913,723 to Johnson; 3,934,699 to Saito et al; 4,088,219 to Binns; and 4,629,052 to Kitamura are illustrative of such prior art combplate safety systems.

DISCLOSURE OF INVENTION

This invention relates to a combplate safety system for an escalator or moving walkway which employs a power interruption switch having heightened sensitivity which is responsive to upward movement of the combplate that results from the wedging action of an object between the treads and combplate. Where necessary due to the weight of the combplate, and especially in older units in the field, the assembly includes a device for preloading the combplate upwardly so as to reduce the effective weight of the combplate. This weight reduction will cause the safety switch to be activated by a lesser wedging force than would be needed to operate the switch in the absence of the upwardly directed preload. The system is thus rendered operable at lower wedging forces, thus becoming inherently safer to passengers.

The safety switch includes a finely threaded combplate sensor which can be very precisely adjusted relative to the combplate. The sensor is mounted on a pivoting rocker which includes a switch-contacting arm that acts as a multiplier of the extent of movement of the combplate sensor. If the sensor is lifted 1 mm by upward movement of the combplate, the switch-contacting arm will move 2 mm; or 3 mm, as desired. Thus a relatively minute degree of movement of the combplate can activate the switch and shut the escalator off.

The upward preloading of the combplate is accomplished by combplate supports which have a controlled spring component that is stressed by the combplate. The spring component is one that when compressed to a certain degree will create a predictable preload reaction that lowers the effective weight of the combplate by a known value. Thus, a one hundred pound combplate can be vertically preloaded to impart thereto an effective weight of ninety pounds, for example. In this manner, new safety code changes can be met by relative slight modifications of older equipment, without completely replacing such equipment. The preferred form of combplate preloading device is a curved steel washer, termed a "wave washer" which is presently used to preload bearings.

It is therefore an object of this invention to provide an improved combplate safety assembly which reacts to a foreign object becoming wedged between the treads and combplate of an escalator or moving walkway.

It is an additional object of this invention to provide a safety assembly of the character described which can shut off the escalator or walkway in certain instances.

It is a further object of this invention to provide a safety assembly of the character described which responds to upward movement of the combplate.

It is another object of this invention to provide a safety assembly of the character described where the effective weight of the combplate is reduced to increase operational sensitivity of the assembly.

These and other objects and advantages of the invention will become more readily apparent from the following description of a preferred embodiment of the invention when taking in conjunction with the accompanying drawings in which:

BRIEF DESCRIPTION OF THE DRAWING

FIG. 1 is a fragmented perspective view of the landing area of an escalator or moving walkway which is equipped with the safety assembly of this invention;

FIG. 2 is a side elevational view, partially in section, of the landing area shown as viewed from the path of movement of the steps of the escalator or walkway;

FIG. 4 is a fragmented sectional view of the combplate support/preload assembly which is used to lower the effective weight of the combplate showing the preload assembly in its unloaded condition; FIG. 6 is a schematic view of an escalator which includes the stop switch assembly of this invention.

BEST MODE FOR CARRYING OUT THE INVENTION

Figure 3:
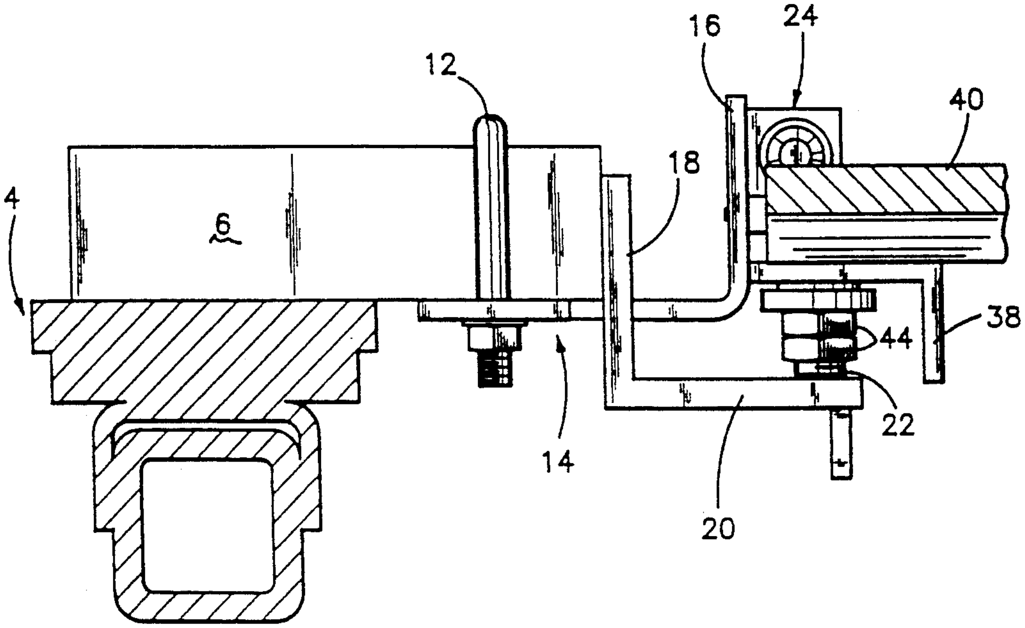
FIG. 3 is an end elevation view of the landing area, partially in section, as seen from the left hand end of FIG. 2.

Referring first to FIG. 6, an escalator is shown schematically. The escalator includes a step chain 1 which is mounted on sprockets 3 and 5, with the sprocket 3 being a drive sprocket powered by an electric motor 7. A plurality of steps 9 are mounted on the chain 1 between balustrades 11, the steps 9 moving along a passenger-conveying path of travel toward an exit landing 2. A motor control stop switch 24, which will be described in greater detail hereinafter, is connected to the motor 7 via a line 25.

Referring now to FIGS. 1-3, the exit landing area of an escalator or moving walkway is shown and is denoted generally by the numeral 2. The escalator truss 4 has a U-shaped member 6 secured thereto via bolts 8. The member 6 extends from the truss 4 toward the area 10 on the escalator through which the escalator steps (not shown) travel. A U-clamp 12 connects a bracket 14 to the member 6, the bracket 14 including a first upwardly turned switch assembly support flange 16 and a second downwardly depending L-shaped combplate support 18. The combplate support 18 has a lower horizontal platform 20 which carries a vertical threaded stud 22 welded thereto.

The flange 16 has mounted thereon an electrical switch assembly 24 which is a component of the electrical circuit for the escalator or walkway power source. The switch 24 is preferably a "normally closed" switch which includes spring-biased button 26 which, when pressed, opens the switch 24. When the switch 24 is closed, the escalator or walkway is powered, or "on", and when the switch 24 is opened, the escalator or walkway is shut off. Obviously, the opposite mode of operation of the switch 24 would provide an equivalent control for the operation of the safety assembly. A switch control rocker 28 is mounted on the flange 16 for pivotal movement about a pin 30. The rocker 28 has a horizontal arm 32 and a vertical arm 34. The horizontal arm 32 has a finely threaded adjustment screw combplate sensor 36 therein which contacts an angle iron 38 that is welded to one side edge of the combplate 40 outboard of the path of travel 10 of the steps. The adjustment screw 36 is properly set so as to position the rocker vertical arm 34 against the switch button 26, whereby appropriate upward movement of the combplate 40 and angle iron 38 will cause the rocker arm 34 to depress the switch button 26 and actuate the switch 24 to interrupt power to the escalator. The switch-actuating upward movement of the combplate 40 will result from wedging of objects between combplate 40 and the steps. The switch 24 is preferably a micro plunger make/break switch which is a component of a conventional safety circuit that can interrupt prior to the conveyor. Preferably, the switch will be one that must be manually reset after it has been actuated.

A pair of jam nuts 42 are mounted on the stud 22 and are spaced apart from the angle iron 38 by a distance D which defines the maximum extent of possible upward movement of the combplate 40. The distance D is preferably no more than 2 mm so as to limit the extent of possible upward movement of the combplate. The distance D also defines the degree of switch-actuating movement of the adjustment screw 36. It will be noted that the distance between the centerline of the adjustment screw 36 and the pivot pin 30 is one half the distance between the centerline of the switch button 26 and the pivot pin 30. The length of the vertical arm 34 thus serves to create a switch-actuating stroke which is a multiple of the distance D. In this manner, a relatively small upward movement of the combplate 40 will serve to actuate the switch 24.

Figure 5:
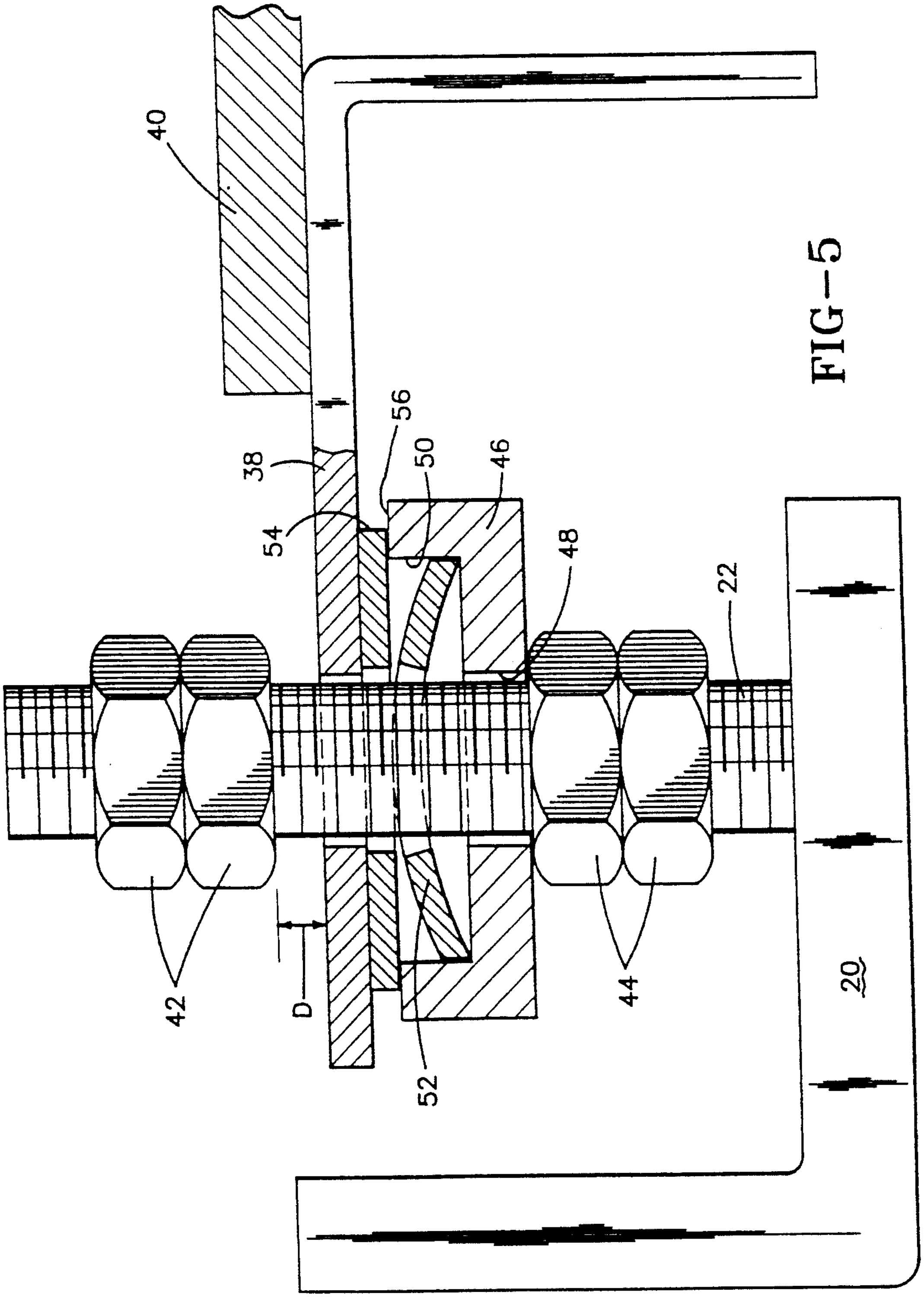
FIG. 5 is a fragmented sectional view of the combplate and its support assembly showing the latter in its loaded condition.

As previously noted, when the combplate 40 is a relatively heavy piece, a preloading support assembly will be provided to lessen the amount of wedging force that must be present to actuate the switch 24. Details of a preferred embodiment of such a support assembly are shown in FIGS. 4 and 5. The stud 22 has a pair of lower jam nuts 44 mounted thereon, which support a cup 46. The cup 46 has a through bore 48 that receives the stud 22, and an enlarged counterbore 50 in which a curved washer 52 is seated. A flat washer 54 is disposed on the top surface 56 of the cup 46 and provides a contact surface for the angle iron 38. FIG. 4 shows the support assembly in its unloaded configuration, and FIG. 5 shows the loaded configuration. As will be noted from FIG. 4, when there is no downwardly directed force imposed on the assembly, the curved washer 52 will project above the top surface 56 of the cup 46, and the flat washer 54 will rest on the curved washer 52, and be elevated above the top surface 56 of the cup 46. It will be noted that the curved washer 52 rests on the bottom surface 49 of the counterbore 50 and is constrained by the side wall 51 of the counterbore 50. The depth of the counterbore 50 is the factor which controls the extent to which the curved washer 52 will preload and reduce the effective weight of the combplate 40. As noted, these curved washers are used to preload bearings, and can be obtained from Associated Spring Co., Bristol, Conn. The washers are sold with tables that specify and equate washer deformation with preload values. The preloaded combplate support assembly described above can support a 130 lb. combplate and reduce its effective weight to only 105 lb.

It will be readily appreciated that the combplate stop switch assembly can operate with a minimal amount of upward movement of the combplate. The assembly can be included in new equipment or can be retrofitted onto older equipment in the field. The preloading of the combplate supports allows older, heavier equipment to be rendered operable with minimal upward wedging forces, and brings such equipment into compliance with modern code requirements which require more sensitive stopping systems.

Since many changes and variations of the disclosed embodiment of the invention may be made without departing from the inventive concept, it is not intended to limit the invention otherwise than as required by the appended claims.

What is claimed is:

1. An escalator or moving walkway assembly comprising:

a) an exit landing;

b) a plurality of interconnected steps powered by an electric motor and movable along a passenger-conveying path of travel terminating at said exit landing;

c) a combplate means disposed at said exit landing whereby said steps pass beneath said combplate, said combplate means forming a platform on which passengers alight from said steps, said combplate means being mounted for vertical movement relative to said steps in response to entrapment of foreign matter between said steps and said combplate means; and d) spring means operably connected to said combplate means for vertically preloading said combplate means so as to lessen the effective weight of the latter.

2. The assembly of claim 1, further comprising switch means operably connected to said electric motor, said switch means being positioned relative to said combplate means so as to be actuated by the latter to interrupt power to said electric motor when said combplate means is displaced upwardly from a normal rest position.

3. The assembly of claim 2, wherein said switch means comprises a switch and a switch-actuating rocker, said switch actuating rocker having a first arm which is disposed adjacent said switch, and a second arm which is adjacent to said combplate means, said rocker being pivotably movable about a pivot axis which is interposed between said first and second arms.

4. The assembly of claim 3, wherein said second arm is equipped with an adjustable means for contacting the combplate means, which can be selectively moved toward and away from said combplate means, said contacting means being operable to establish a deflection stroke for said rocker which equals a predetermined upward deflection of said combplate means.

5. The assembly of claim 4, wherein said first arm on said rocker has a switch-engaging point which is spaced apart from said pivot axis a distance which is a fixed multiple of the distance between said pivot axis and said contacting means so as to impart to said first arm a switch-actuating stroke which is greater by said fixed multiple than said deflection stroke of said second arm.

6. The assembly of claim 4, further comprising means for limiting the extent of possible upward movement of said combplate means to ensure that the combplate cannot be deflected upwardly a distance which substantially exceeds said deflection stroke.

7. The assembly of claim 1, further comprising a fixed stop for supporting said combplate means, said fixed stop limiting the degree of preloading of said combplate means by said spring means whereby the effective weight of said combplate means is closely controlled.

8. An escalator or moving walkway assembly comprising:

a) an exit landing;

b) a plurality of interconnected steps powered by an electric motor and movable along a passenger-conveying path of travel terminating at said exit landing;

c) a combplate means disposed at said exit landing whereby said steps pass beneath said combplate means, said combplate forming a platform on which passengers alight from said steps, said combplate means being mounted for vertical movement relative to said steps in response to entrapment of foreign matter between said steps and said combplate means;

d) switch means operably connected to said electric motor, said switch means being positioned adjacent to said combplate means; and e) a rocker member mounted adjacent to said combplate means and said switch means, said rocker member being mounted for pivotal movement about a pivot axis, said rocker member having a first arm for contacting said switch means and a second arm for contacting said combplate means, and said rocker member being operable to pivot about said pivot axis to actuate said switch to interrupt power to the electric motor in response to entrapment-induced upward movement of said combplate means.

9. The assembly of claim 8, wherein said second rocker member arm carries an adjustable means for contacting said combplate means for use in presetting the pivotal position of said rocker member relative to said switch means.

10. The assembly of claim 9, wherein the distance along said first rocker member arm from said pivot axis to a point on said first arm which touches said switch means is a multiple of the distance along said second arm between said pivot axis and said contacting means to provide a switch-actuating stroke in said first arm which is a multiple of the extent of upward deflection of said combplate means.

11. The assembly of claim 10, further comprising stop means for limiting the maximum possible upward entrapment-induced deflection movement of said combplate means.

12. The assembly of claim 3, wherein said second arm is equipped with an adjustable means for contacting a member attached to the combplate means, which can be selectively moved toward and away from said member, said contacting means being operable to establish a deflection stroke for said rocker which equals a predetermined upward deflection of said combplate means.

13. The assembly of claim 12, wherein said first arm on said rocker has a switch-engaging point which is spaced apart from said pivot axis a distance which is a fixed multiple of the distance between said pivot axis and said contacting means so as to impart to said first arm a switch-actuating stroke which is greater by said fixed multiple than said deflection stroke of said second arm.

14. The assembly of claim 12, further comprising means for limiting the extent of possible upward movement of said combplate means to ensure that the combplate means cannot be deflected upwardly a distance which substantially exceeds said deflection stroke.

15. An escalator or moving walkway assembly comprising:

a) an exit landing;

b) a plurality of interconnected steps powered by an electric motor and movable along a passenger-conveying path of travel terminating at said exit landing;

c) a combplate disposed at said exit landing whereby said steps pass beneath said combplate, said combplate forming a platform on which passengers alight from said steps, said combplate being mounted for vertical movement relative to said steps in response to entrapment of foreign matter between said steps and said combplate;

d) switch means operably connected to said electric motor, said switch means being positioned adjacent to said combplate; and e) a rocker member mounted adjacent to said combplate and said switch means, said rocker member being mounted for pivotal movement about a pivot axis, said rocker member having a first arm for contacting said switch means and a second arm for contacting a member attached to said combplate, and said rocker member being operable to pivot about said pivot axis to actuate said switch to interrupt power to the electric motor in response to entrapment-induced upward movement of said combplate.

16. The assembly of claim 15, wherein said second rocker member arm carries an adjustable means for contacting a member attached to said combplate for use in presetting the pivotal position of said rocker member relative to said switch means.

17. The assembly of claim 16, wherein the distance along said first rocker member arm from said pivot axis to a point on said first arm which touches said switch means is a multiple of the distance along said second arm between said pivot axis and said contacting means to provide a switch-actuating stroke in said first arm which is a multiple of the extent of upward deflection of said combplate.

18. The assembly of claim 17, further comprising stop means for limiting the maximum possible upward entrapment-induced deflection movement of said combplate.

* * * * *